United States Patent
Faruk et al.

(10) Patent No.: US 10,171,401 B2
(45) Date of Patent: Jan. 1, 2019

(54) PERSONALIZED ELECTRONIC MESSAGE

(71) Applicant: Microsoft Technology Licensing, LLC., Redmond, WA (US)

(72) Inventors: Omar Faruk, Oslo (NO); Sangram Jyoti Bal, Oslo (NO); Azmil Macksood, Oslo (NO); Rezaul Hoque, Oslo (NO); Stefan Alexander Ashall, Oslo (NO); Vincent Olislagers, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 368 days.

(21) Appl. No.: 14/854,876

(22) Filed: Sep. 15, 2015

(65) Prior Publication Data

US 2017/0078232 A1    Mar. 16, 2017

(51) Int. Cl.
*H04L 12/58* (2006.01)
*H04L 12/26* (2006.01)
*H04L 29/08* (2006.01)
*G06Q 10/10* (2012.01)

(52) U.S. Cl.
CPC .......... *H04L 51/22* (2013.01); *G06Q 10/107* (2013.01); *H04L 43/045* (2013.01); *H04L 67/02* (2013.01); *H04L 67/306* (2013.01)

(58) Field of Classification Search
CPC ..... H04L 67/02; H04L 67/306; H04L 43/045; H04L 51/22; G06Q 10/107
See application file for complete search history.

(56) References Cited

U.S. PATENT DOCUMENTS

| | | | |
|---|---|---|---|
| 7,117,271 B2 | 10/2006 | Haverstock et al. | |
| 7,530,021 B2 | 5/2009 | Cheng et al. | |
| 7,739,340 B2 | 6/2010 | Arenburg et al. | |
| 7,974,871 B2 | 7/2011 | Oral et al. | |
| 7,987,233 B1 | 7/2011 | Osborne et al. | |
| 8,200,520 B2 | 6/2012 | Chen et al. | |
| 8,312,091 B2 | 11/2012 | Horstmann et al. | |
| 8,386,482 B2 * | 2/2013 | Gopalakrishnan | G06F 17/30867 707/732 |
| 9,087,324 B2 * | 7/2015 | Osipkov | G06Q 10/107 |

(Continued)

OTHER PUBLICATIONS

"International Search Report and Written Opinion Issued in PCT Application No. PCT/US2016/050598", dated Oct. 27, 2016, 11 Pages.

(Continued)

*Primary Examiner* — Kostas J Katsikis
(74) *Attorney, Agent, or Firm* — Merchant & Gould

(57) ABSTRACT

Enhancing and personalizing an electronic message with related and relevant information based on context of the message and recipients of the message is provided. A mailbox delivery agent receives an electronic message addressed to a recipient, extracts context data from the electronic message, queries an information source for information related to the context data and relevant to the recipient user, receives a response including information related to the context data and relevant to the recipient user, and generates and appends one or more information elements representative of the information related to the context data and relevant to the recipient user to the electronic message.

20 Claims, 11 Drawing Sheets

(56) References Cited

U.S. PATENT DOCUMENTS

| | | | |
|---|---|---|---|
| 2004/0059712 A1 | 3/2004 | Dean et al. | |
| 2004/0215498 A1 | 10/2004 | Leist | |
| 2008/0147469 A1 | 6/2008 | Murillo et al. | |
| 2008/0294482 A1 | 11/2008 | Bank et al. | |
| 2010/0161367 A1 | 6/2010 | Keohane et al. | |
| 2010/0169917 A1* | 7/2010 | Harboe | H04N 7/15 725/34 |
| 2010/0223341 A1* | 9/2010 | Manolescu | G06F 17/30867 709/206 |
| 2013/0018964 A1* | 1/2013 | Osipkov | G06Q 10/107 709/206 |
| 2013/0159433 A1 | 6/2013 | Chavan | |
| 2013/0254213 A1* | 9/2013 | Cheng | G06Q 50/01 707/748 |
| 2013/0254305 A1* | 9/2013 | Cheng | H04L 51/32 709/206 |
| 2013/0290079 A1 | 10/2013 | Chavan | |
| 2013/0332308 A1* | 12/2013 | Linden | G06Q 30/0631 705/26.7 |
| 2014/0207794 A1* | 7/2014 | Du | H04L 51/32 707/748 |
| 2014/0278787 A1* | 9/2014 | Introna | G06Q 30/0203 705/7.32 |
| 2014/0343978 A1 | 11/2014 | Bisht | |
| 2014/0379819 A1 | 12/2014 | Chestnut et al. | |
| 2016/0191448 A1* | 6/2016 | Eck | H04L 51/32 709/206 |

OTHER PUBLICATIONS

"Configuring the meeting invitation in Lync Server 2013", Retrieved on: Jul. 8, 2015, Available at; https://technet.microsoft.com/en-us/library/gg398638(v=ocs.15).aspx.

\* cited by examiner

PERSONALIZED ELECTRONIC MESSAGE

BACKGROUND

When an electronic message (e.g., an email, a meeting request, etc.,) is sent to one or more recipient users, the message may include information manually added by a sender user. For example, if the electronic message is an email, the sender user may include information, such as information or an attachment of information items (e.g., documents) pertaining to the subject of the email. As another example, if the electronic message is a meeting request, the sender user (i.e., meeting organizer) may include information, such as a generalized agenda for the meeting, an attachment of information items that will be presented at the meeting, etc.

Further, if the sender user sends the message to a plurality of recipients, the same message and the same information are sent to each recipient user. For example, if the sender user sends a meeting request, each recipient user of the request receives the same copy of the request.

In an enterprise situation, for example, a company, school, social network, etc., a given user may encounter hundreds (or more) of documents or other information items, each with varying degrees of relevance, interest, or importance to the user, and that are oftentimes scattered across a variety of workloads and storage systems (e.g., email accounts, calendars, social feeds, intranet sites, network file systems, etc.). A sender of an electronic message may not be aware of information items that are available and that are related to the subject matter of the electronic message or relevant to individual recipients of the message. Additionally, a recipient of an electronic message may not be aware of information items that are available and relevant to him/her and that are related to the message.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter. Aspects are directed to an automated system, method, and device for personalizing an electronic message with relevant information based on context of the message and a recipient of the message.

In some examples, a personalized electronic message system includes one or more processors for executing programmed instructions, memory coupled to the one or more processors for storing program instruction steps for execution by the computer processor, and a mailbox delivery agent for receiving an electronic message addressed to a recipient user, extracting context data from the electronic message, querying an information source for information related to the context data and relevant to the recipient user, receiving a response including information related to the context data and relevant to the recipient user, and generating and appending one or more information elements representative of the information related to the context data and relevant to the recipient user to the electronic message.

In some examples, a method for personalizing an electronic message with relevant information based on context of the message and a recipient of the message includes receiving an electronic message addressed to a recipient user, extracting context data from the electronic message, querying an information source for information related to the context data and relevant to the recipient user, receiving a response including information related to the context data and relevant to the recipient user, and generating and appending one or more information elements representative of the information related to the context data and relevant to the recipient user to the electronic message.

In some examples, one or more computer storage media storing computer-usable instructions that, when used by one or more computing devices, cause the one or more computing devices to perform a method for personalizing an electronic message with relevant information based on context of the message and a recipient of the message, the method comprising receiving an electronic message addressed to a recipient user, extracting context data from the electronic message, querying an information source for information related to the context data and relevant to the recipient user, receiving a response including information related to the context data and relevant to the recipient user, and generating and appending one or more information elements representative of the information related to the context data and relevant to the recipient user to the electronic message.

Enhancing and personalizing an electronic message with related information and information that is relevant to a user helps to increase the user's knowledge of information in an enterprise that is related to the received electronic message and that is relevant to the user. Additionally, the user is enabled to be more efficient and productive by not having to search for information related to the electronic message or relevant to the user.

Examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
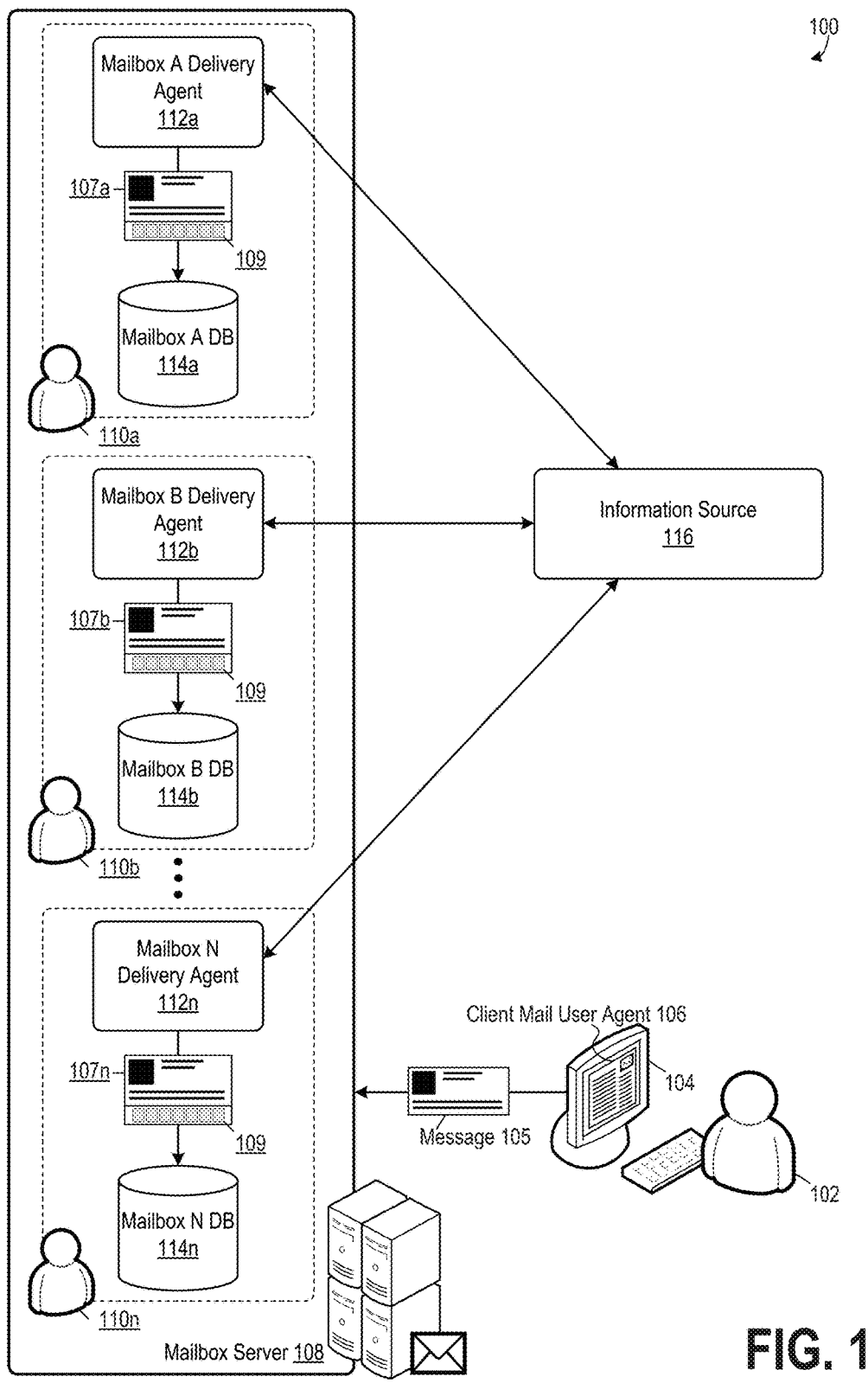
FIG. 1 is a simplified block diagram showing components of an example system for enhancing and personalizing an electronic message with relevant information based on context of the message and a recipient of the message.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for enhancing and personalizing an electronic message with relevant information based on context of the message and a recipient of the message. In some examples, a mailbox delivery agent receives an electronic message addressed to a recipient user, extracts context data from the electronic message, queries an information source for information related to the context data and relevant to the recipient user, receives a response including information related to the context data and relevant to the recipient user, and generates and appends one or more information elements representative of the information related to the context data and relevant to the recipient user to the electronic message.

According to an example, the electronic message is a request to attend a meeting, wherein the request is created by a sender user (i.e., meeting organizer) and includes one or more meeting invitees who are recipients of the request. The meeting request is sent to a mailbox server, which receives the meeting request and distributes it to one or more mailbox delivery agents. According to an aspect, each mailbox delivery agent is associated with a recipient's mailbox. For each recipient, the mailbox delivery agent associated with a given recipient extracts context data (e.g., subject of the meeting, other invitees, etc.) from the meeting request, and interrogates an information source for content or information that is related to the extracted context data and that is relevant to the recipient associated with the mailbox delivery agent.

According to an example, the information source is a graph server that analyzes and collects a variety of signals of activities from across various enterprise workloads, and stores the activity signals in a graph index as a network of nodes and edges. For example, the mailbox delivery agent interrogates the graph server for content that is related to the subject of the meeting on which the recipient has not previously acted. As another example, the mailbox delivery agent interrogates the graph server for information related to the one or more other invitees including in the meeting request with whom the recipient has not previously interacted.

If an information item that is related to the extracted context data and that is relevant to the recipient or information related to another invitee of the meeting is discovered, the mailbox delivery agent generates an information element representative of the content item or information, appends the information element to the meeting request, and delivers the meeting request to the recipient's mailbox.

With reference now to FIG. 1, a simplified block diagram of one example of a personalized electronic message system 100 is shown. As illustrated, the personalized electronic message system 100 includes a mailbox server 108, which is operable to receive incoming electronic messages 105 from sender users 102, and forward outgoing electronic messages for delivery to recipient users 110*a-n* (collectively, 110). A sender user 102 may utilize a client mail user agent 106 executing on a computing device 104 to compose or generate an electronic message 105, such as an email, a meeting request, or other type of electronic message. For example, the client mail user agent 106 may be an email application, a calendaring application, or other type of application operable to generate an electronic message 105 and communicate with the mailbox server 108 for delivery of the electronic message 105. The client mail user agent 106 may be web-based or a local application. According to an aspect, the client mail user agent 106 uses a standard protocol, such as Simple Mail Transfer Protocol (SMTP) or extended SMTP (ESMTP) for sending electronic messages 105.

The client mail user agent 106 is further operable to receive electronic messages 105 from the mailbox server 108, and allow a user to view and interact with a received electronic message 105. For example, the client mail user agent 106 is operable to display the electronic message 105 on a display surface associated with the computing device 104. According to an aspect, the client mail user agent 106 uses a standard protocol, such as Post Office Protocol (POP) or Internet Message Access Protocol (IMAP) for receiving electronic messages 105. The computing device 104 illustrated in FIG. 1 is illustrated as a desktop-style computing device; however, as should be appreciated, the client mail user agent 106 may execute on any suitable computing device, such as a desktop computer, laptop computer, tablet computer, handheld computing device, mobile communication device, wearable device, gaming device, and the like.

When an incoming electronic message 105 from a sender user 102 is received, the mailbox server 108 is operable to transmit the electronic message 105 to the intended recipients 110 by routing the electronic message 105 to one or more mailbox delivery agents 112*a-n* (collectively, 112). According to examples, the mailbox server 108 includes or is communicatively attached to a plurality of mailbox delivery agents 112, wherein each mailbox delivery agent 112 is connected to a mailbox (i.e., mailbox database 114*a-n*, collectively 114) of a recipient user 110. When an electronic message 105 is received by a mailbox delivery agent 112 associated with an intended recipient 110, the mailbox delivery agent 112 is further operable to parse the electronic message 105 for context data. For example, the mailbox delivery agent 112 identifies and extracts at least one of: a subject of the electronic message 105 and other recipients 110 of the electronic message 105.

Referring still to FIG. 1, the mailbox delivery agent 112 associated with each recipient user 110 interrogates an information source 116 for information relating to the extracted context data. In some examples and as will be described in greater detail with respect to FIGS. 2 and 3, the information source 116 is a graph server that captures and analyzes metadata from across various enterprise workloads, and stores the activity signals in a queryable graph index as a network of nodes and edges. For example, as users work on information items and interact with their peers and colleagues, activity signals are generated, and are collected and stored by the graph server. The mailbox delivery agent 112 is operable to query the information source 116 (e.g., graph server) for related information, such as information items (e.g., documents, conversations, meetings, etc.) related to the subject of the electronic message 105 and information about the other recipient users 110 of the electronic message 105.

According to examples, the mailbox delivery agent 112 is operable to interrogate the information source 116 for information that is not only related to the extracted context data, but that is also relevant to the recipient user 110. For example, the mailbox delivery agent 112 is operable to interrogate the information source 116 for information items (e.g., documents, conversations, meetings, etc.) that are both related to the subject of the electronic message 105 and on which the recipient user 110 has not previously acted (e.g., viewed, authored, modified, etc.). As another example, the mailbox delivery agent 112 is operable to interrogate the information source 116 for information associated with the other recipients of the electronic message 105 with whom the recipient user 110 associated with the mailbox delivery agent 112 has not previously met, worked, or communicated. The information associated with other recipients may include such information as, but is not limited to, user profile information, contact information, an image, an organizational chart, information items authored by the other recipients, etc.

According to examples, the mailbox delivery agent 112 is operable to receive a response from the information source 116 including metadata associated with information items that are related to the subject of the electronic message 105 and that are relevant to the recipient user 110 and metadata associated with information relating to the other recipients of the electronic message 105 and that is relevant to the recipient user 110.

According to examples, the mailbox delivery agent 112 is further operable to generate selectable visual information elements 109 representative of the information items and information, and append the visual information elements 109 to the electronic message 105. Accordingly, the electronic message 105 is converted from a general electronic message 105 into a personalized electronic message 107a-n (collectively, 107) that is enriched and personalized for the recipient user 110. For example, each recipient user 110a-n receives an individualized personalized electronic message 107a-n that comprises information that is related to the subject and recipients of the electronic message and that is relevant to the individual recipient user 110a-n.

Consider, for example, that the electronic message 105 is a meeting request that includes three meeting invitees: user A, user B, and user C. The sender user 102 generates and sends the meeting request (i.e., electronic message 105) via the client mail user agent 106. The mailbox server 108 determines the intended recipients 110a,b,c of the meeting request (i.e., the meeting invitees), and routes the meeting request to three mailbox delivery agents 112: mailbox A delivery agent 112a connected to the mailbox of recipient user A 110a, mailbox B delivery agent 112b connected to the mailbox of recipient user B 110b, and mailbox C delivery agent 112c connected to the mailbox of recipient user C 110c. Mailbox A delivery agent 112a parses the meeting request (i.e., electronic message 105) intended for recipient user A 110a, and identifies and extracts at least one of: a subject of the meeting request (e.g., a topic of the meeting) and the other meeting invitees (i.e., recipient users B 110b and C 110c). Mailbox B delivery agent 112b parses the meeting request (i.e., electronic message 105) intended for recipient user B 110b and identifies and extracts, and identifies and extracts at least one of: a subject of the meeting request (e.g., a topic of the meeting) and the other meeting invitees (i.e., recipient users A 110a and C 110c). Additionally, mailbox C delivery agent 112c parses the meeting request (i.e., electronic message 105) intended for recipient user C 110c, and identifies and extracts at least one of: a subject of the meeting request (e.g., a topic of the meeting) and the other meeting invitees (i.e., recipient users A 110a and B 110b).

Each mailbox delivery agent 112a,b,c queries the information source 116 for information related to the extracted data and that is relevant to the recipient user 110a,b,c associated with the mailbox delivery agent 112a,b,c. For example, mailbox A delivery agent 112a queries the information source 116 for information related to the subject of the meeting request, related to recipient users B and C 110b,110c, and that is relevant to recipient user A 110a. Each mailbox delivery agent 112a,b,c receives a response from the information source 116 including metadata associated with information relating to the meeting request subject and the other recipients of the electronic message 105 and that is relevant to the recipient user 110 associated with the mailbox delivery agent 112a,b,c, and generates visual information elements 109, such as selectable content cards that include one or more pieces of metadata associated with the information. The mailbox A delivery agent 112a then appends the visual information elements 109 it generated to the electronic message 105 for recipient user A 110a, mailbox B delivery agent 112b appends the visual information elements 109 it generated to the electronic message 105 for recipient user B 110b, and mailbox C delivery agent 112c appends the visual information elements 109 it generated to the electronic message 105 for recipient user C 110c.

With reference still to FIG. 1, the mailbox delivery agent 112 is further operable to transmit the personalized electronic message 107 (i.e., the electronic message 105 and the appended visual information elements 109 representing the related and relevant information) to the mailbox database 114 of the recipient user 110. Continuing with the example above, the mailbox A delivery agent 112a delivers the personalized electronic message 107, including the visual information elements 109 it generated for recipient user A 110a, to recipient user A's mailbox database 114A, mailbox B delivery agent 112b delivers the personalized electronic message 107, including the visual information elements 109 it generated for recipient user B 110b, to recipient user B's mailbox database 114b, and mailbox C delivery agent 112c delivers the personalized electronic message 107, including the visual information elements 109 it generated for recipient user C 110c, to recipient user C's mailbox database 114c.

Figure 2:
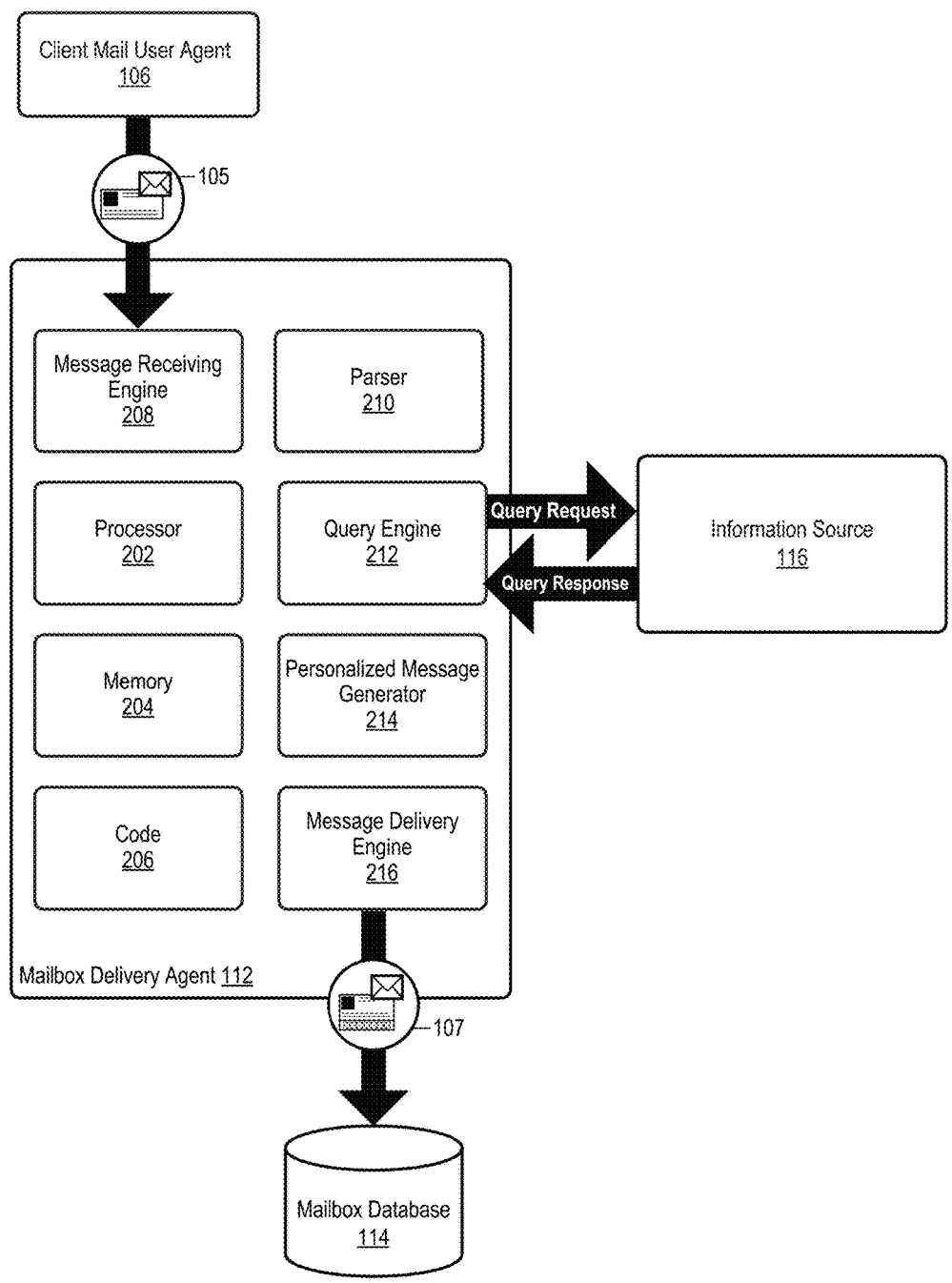
FIG. 2 is a simplified block diagram showing various components of a mailbox delivery agent.

With reference now to FIG. 2, a simplified block diagram illustrating components of the mailbox delivery agent 112 is shown. According to examples, the mailbox delivery agent 112 includes at least one processor 202, at least one memory 204 coupled to the at least one processor 202, and code 206 which is executable by the processor 202 to cause: a message receiving engine 208 to receive an electronic message 105; a parser 210 to parse the electronic message 105 for context data; a query engine 212 to interrogate an information source 116 for information related to the extracted context data and related to a recipient 110 of the electronic message 105; a personalized message generator 214 to generate one or more visual information elements 109 representing information related to the extracted context data and related to the recipient 110 and append the one or more visual information elements 109 to the electronic message 105; and a message delivery engine 216 to transmit the personalized electronic message 107 to the recipient's mailbox database 114.

According to examples, the message receiving engine 208 is illustrative of a software module, system, or device operable to receive an electronic message 105, such as an email, a meeting request, or other electronic message from a client mail user agent 106, such as an email application, a calendaring application, or other type of application operable to generate an electronic message 105 and communicate with the message receiving engine 208 of the mailbox server 108 for delivery of the electronic message 105.

According to examples, the parser 210 is illustrative of a software module, system, or device operable to identify and extract context data from the electronic message 105. For example, the parser 210 is operable to identify and extract a subject of the electronic message 105 and other recipients of the electronic message 105.

According to examples, the query engine 212 is illustrative of a software module, system, or device operable to run a query against an information source 116 for information related to the context data extracted by the parser 210 and related to a recipient 110 of the electronic message 105. According to an example, the information source 116 is a graph server, such as the example graph server 306 illustrated in FIG. 3. A description of the graph server 306 is provided below with reference to FIG. 3.

Figure 3:
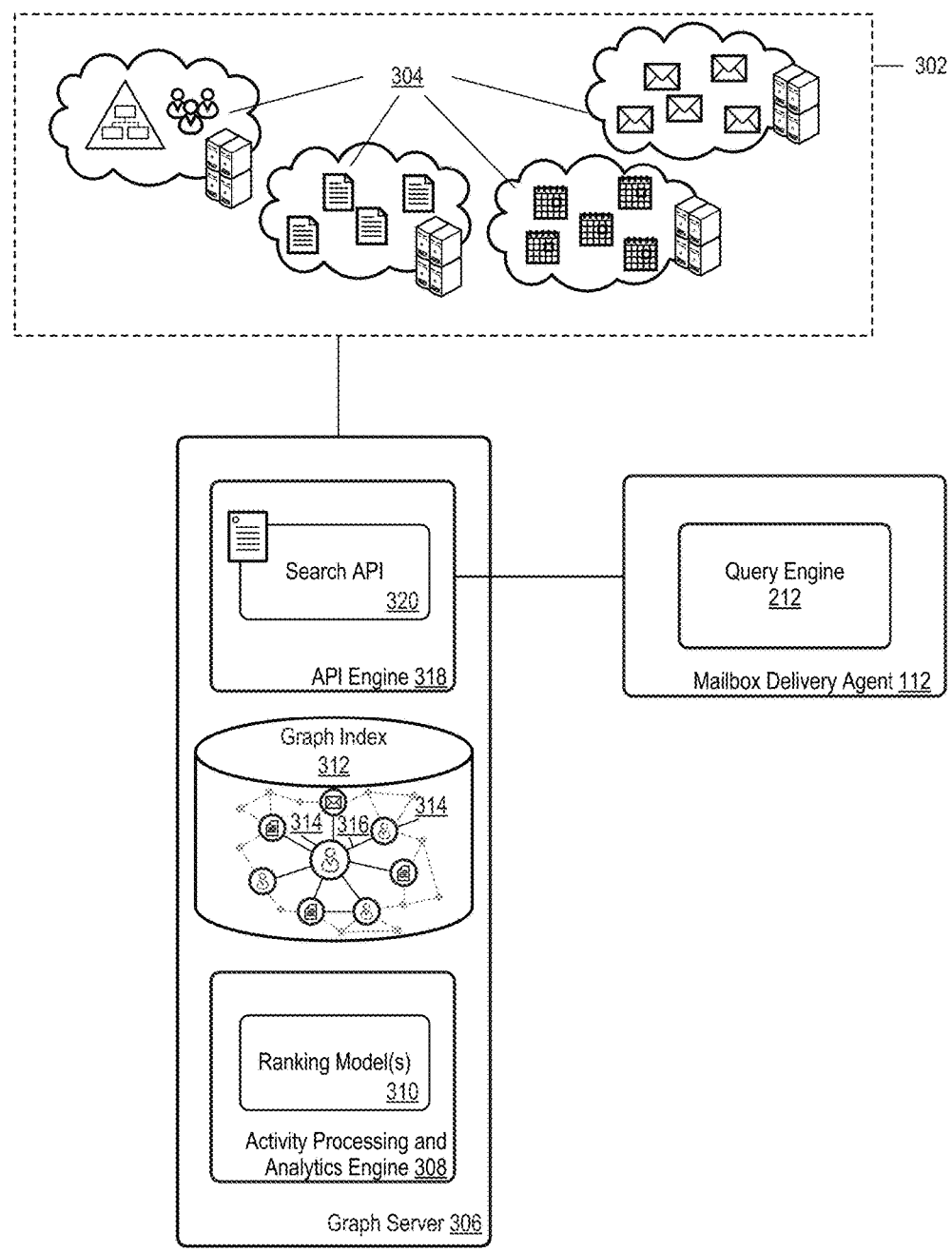
FIG. 3 is a simplified block diagram showing a graph server as an example information source.

As illustrated in FIG. 3, an activity processing and analytics engine 308 analyzes and collects a variety of signals of activities from across various enterprise workloads 302. The workloads 302 include various enterprise data repositories, which may include remote servers, local or remote databases, local or remote shared resources repositories, social networking service servers, emailing system servers, calendaring system servers, and the like. The workloads 302 store various types of information items 304, such as documents, images, data files, video files, audio files, meeting items, communication items, such as electronic mail items, text messages, telephone messages, user profiles, posts, blogs, and the like. As users work on information items 304 and interact with their peers and colleagues, activity signals are generated, are collected by the activity processing and analytics engine 308, and are stored in a graph index 312 as a network of nodes 314 and edges 316.

According to examples, the various activity signals that are stored in the graph index 312 enable individuals to be connected to various other individuals in an enterprise (via person-person activity signals) and to various information items 304 (via person-document activity signals). In the graph index 312, people and information items 304 are stored as nodes 314 and are connected to other nodes by edges 316 representative of the activities between people and activities on information items 304 by people in the organization. A user's relationship with another person or with an information item 304 is defined by the activity signals (i.e., edges 316) connecting the user to the person or to the information item 304.

According to aspects, edges 316 include edge properties such as an actor identifier, an object identifier, an action type, a timestamp of the activity, and a weight assigned by one or more ranking models 310. The one or more ranking models 310 are operable to calculate and assign weights to edges 316 based on various factors, such as the type of activity (e.g., sending/receiving an email to/from a person, sending/receiving an instant message to/from a person, attending a meeting with a person, producing an information item, viewing an information item, sharing an information item, liking an information item, commenting on an information item, modifying an information item, etc.), a frequency of activity, an age decay factor, a type of organizational relationship between people (e.g., colleague, peer, manages, directs, etc.), etc.

According to examples, edges 316 representative of relationships between users may have a weight that is indicative of the social distance between the users. For example, users who have a close social relationship may include individuals who regularly communicate, who attend the same meetings, who work together, interact, or who share an organizational relationship (e.g., colleague, peer, manages, directs, etc.). According to an aspect, a measure of social distance is calculated by the one or more ranking models 310.

According to aspects, nodes 314 include various properties comprising content, metadata, and attributes extracted from information items 304. For example, if a node 314 is representative of the information item 304, the node 314 may include properties such as a title, description, summary, image, uniform resource locator (URL), activity information (e.g., who authored, modified, viewed, commented on, shared an information item 304 and when), as well as various other properties. As another example, if the node 314 is representative of a person, the node 314 may include properties such as the person's name, image, department, title, colleagues, managers, directs, an organizational chart, a URL, and various other pieces of profile information.

According to examples, the graph server 306 includes an API engine 318 comprising a search API 320, which can be called by an application to query the graph index 312. For example, the query engine 212 of the mailbox delivery agent 112 is operable to call the search API 320 and query the graph index 312 via the search API 320 for information items 304 related to a subject of an electronic message 105 and for information items 304 and information (e.g., profile information) related to recipients 110 of the electronic message 105.

According to examples, the query engine 212 is operable to call the search API 320 and query the graph index 312 via the search API 320 for information that is not only related to the subject and the recipients 110 of an electronic message 105, but that is also relevant to the recipient 110 of the electronic message 105 associated with the mailbox delivery agent 112. For example, the query engine 212 can make a call to the graph index 312 via the search API 320 for information items 304 related to the subject or recipients 110 of the electronic message 105 on which the recipient 110 has not acted (e.g., information items 304 that are not connected to the recipient 110 in the graph index 312 via an edge 316, nodes 314 of information items 304 that do not include the recipient 110 in the properties, etc.). As another example, the query engine 212 can make a call to the graph index 312 via the search API 320 for information related to recipients of the electronic message 105 who the recipient 110 does not share a close social relationship (e.g., whom the recipient 110 does not regularly communicate, attend the same meetings, work together, interact, or share an organizational relationship (e.g., colleague, peer, manages, directs, etc.)).

Referring back to FIG. 2, the query engine 212 is further operable to receive a query response from the information source 116 (e.g., the graph server 306). According to examples, the query engine 212 receives a response comprising metadata associated with information items 304 and information identified as related to the electronic message 105 and relevant to the recipient user 110. For example, the metadata may comprise such information as titles, descriptions, summaries, images, URLs, activity information (e.g., who authored, modified, viewed, commented on, shared an information item 304 and when), and profile information (e.g., name, image, department, title, colleagues, managers, directs, an organizational chart, a URL, etc.).

According to examples, the mailbox delivery agent 112 further comprises a personalized message generator 214 illustrative of a software module, system, or device, and operable to generate one or more visual information elements 109 representing the relevant information items 304 related to the electronic message 105 and relevant information related to the other recipients 110. In some examples, the one or more visual information elements 109 are content cards that include one or more pieces of metadata associated with information items 304 and information identified as related to the electronic message 105 and relevant to the recipient user 110. For example, a content card may include a title, summary, description, preview image, tags, information associated with who authored, shared, modified, or liked the information item 304, a link to access the information item 105, etc. As another example, a content card may be representative of another recipient of the electronic message 105 whom the recipient user 110 does not share a close social relationship, and may include an image of the person, the person's name, department, title, colleagues, managers, and directs, an organizational chart, a URL to access a profile page of the person and information items 304 authored by, modified by, shared by, or trending around the person, etc.

According to examples, the personalized message generator 214 is further operable to append the one or more visual information elements 109 to the electronic message 105, thus transforming the electronic message 105 into a personalized electronic message 107.

According to examples, the mailbox delivery agent 112 further comprises a message delivery engine 216, wherein the message delivery engine 216 is illustrative of a software module, system, or device operable to deliver the personalized electronic message 107 to the recipient's mailbox database 114. The recipient 110 is enabled to use a client mail user agent 106 executing on a computing device 104 to access his/her mailbox database 114, and retrieve the personalized electronic message 107 for display on a display surface associated with the computing device 104. The recipient user 110 is further enabled to interact with the personalized electronic message 107. For example, the recipient user 110 may select a visual information element 109 included in the personalized electronic message 107, and view the information item 304 or profile information represented by the visual information element 109.

Figure 4A:
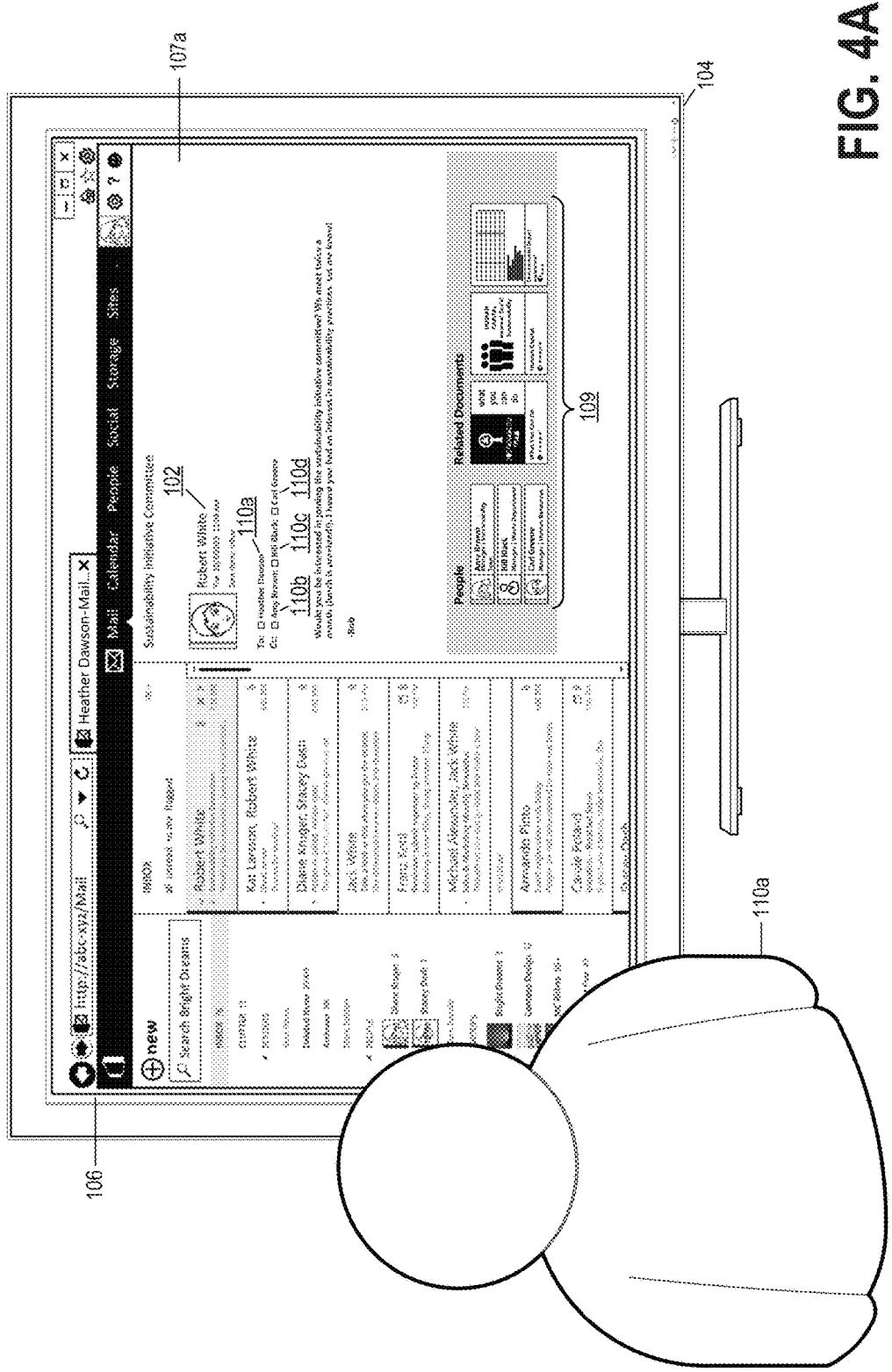
FIG. 4A is an example illustration of a personalized electronic message embodied as an email message.

With reference now to FIG. 4A, an example personalized electronic message 107a embodied as an email message is illustrated. For example, a sender user 102 (in this example, Robert White) sends an electronic message 105 to a plurality of recipient users 110a,b,c,d and, in this example, with a subject of "Sustainability Initiative Committee." After the mailbox A delivery agent 112a receives the electronic message 105 and personalizes the message for recipient user A 110A, the personalized electronic message 107a is delivered to recipient user A's mailbox database 114a.

In the illustrated example, recipient user A 110a "Heather Dawson" receives the personalized electronic message 107a, and the personalized electronic message 107a is displayed on a display screen associated with a computing device 104 via a client mail user agent 106 executing on the computing device 104. As illustrated, the personalized electronic message 107a includes a plurality of visual information elements 109 representing information items 304 determined to be related to the "Sustainability Initiative Committee" subject and relevant to recipient user A 110a and a plurality of visual information elements 109 representing relevant profile information of some of the other recipient users 110b,c,d of the electronic message 105. According to examples, recipient users B, C, and D 110b,c,d each receive different personalized electronic messages 107b,c,d comprising information determined to be related to the message and relevant to the individual recipient user 110b,c,d. According to examples, the visual information elements 109 are selectable. When a visual information element 109 is selected, the recipient user 110a is enabled to view the information item 304 or information represented by the visual information element 109.

Figure 4B:
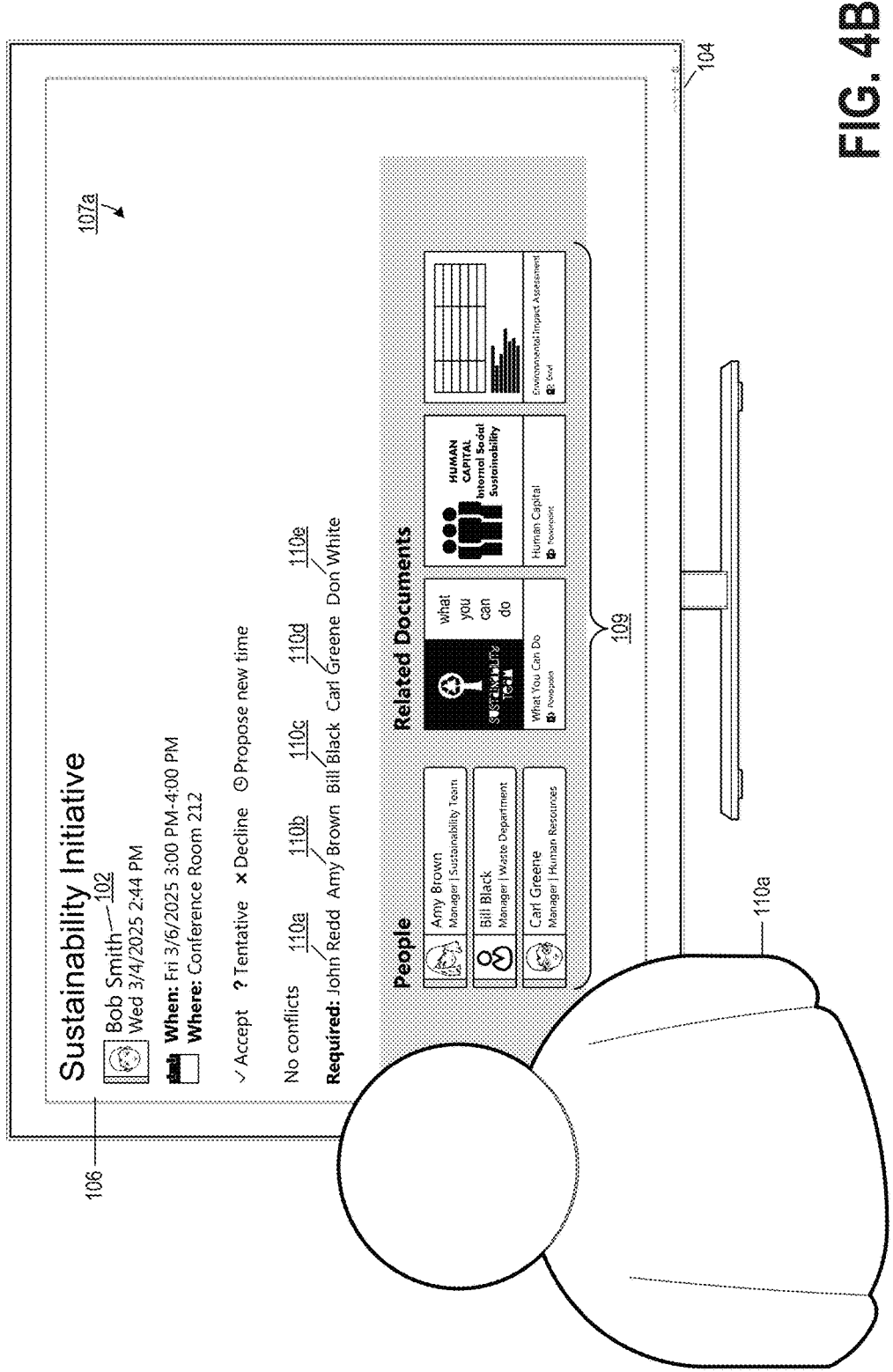
FIG. 4B is an example illustration of a personalized electronic message embodied as a meeting request.

With reference now to FIG. 4B, an example personalized electronic message 107a embodied as a meeting request message is illustrated. For example, a sender user 102 (in this example, Bob Smith) sends an meeting request including a plurality of meeting invitees (i.e., recipient users 110a,b,c,d,e) and, in this example, with a meeting subject of "Sustainability Initiative." After the mailbox A delivery agent 112a receives the meeting request message (i.e., electronic message 105) and personalizes the message for recipient user A 110A, the personalized electronic message 107a is delivered to recipient user A's mailbox database 114a.

In the illustrated example, recipient user A 110a "John Redd" receives the personalized electronic message 107a (i.e., personalized meeting request), and the personalized electronic message 107a is displayed on a display screen associated with a computing device 104 via a client mail user agent 106 executing on the computing device 104. As illustrated, the personalized meeting request includes a plurality of visual information elements 109 representing information items 304 determined to be related to the "Sustainability Initiative" meeting subject and relevant to recipient user A 110a and a plurality of visual information elements 109 representing relevant profile information of some of the other recipient users 110b,c,d (i.e., meeting invitees) of the meeting request. According to examples, recipient users B, C, D, and E 110b,c,d,e each receive different personalized meeting requests comprising information determined to be related to the meeting subject and relevant to the individual recipient user 110b,c,d,e. According to examples, the visual information elements 109 are selectable. When a visual information element 109 is selected, the recipient user 110a is enabled to view the information item 304 or information represented by the visual information element 109.

Figure 4C:
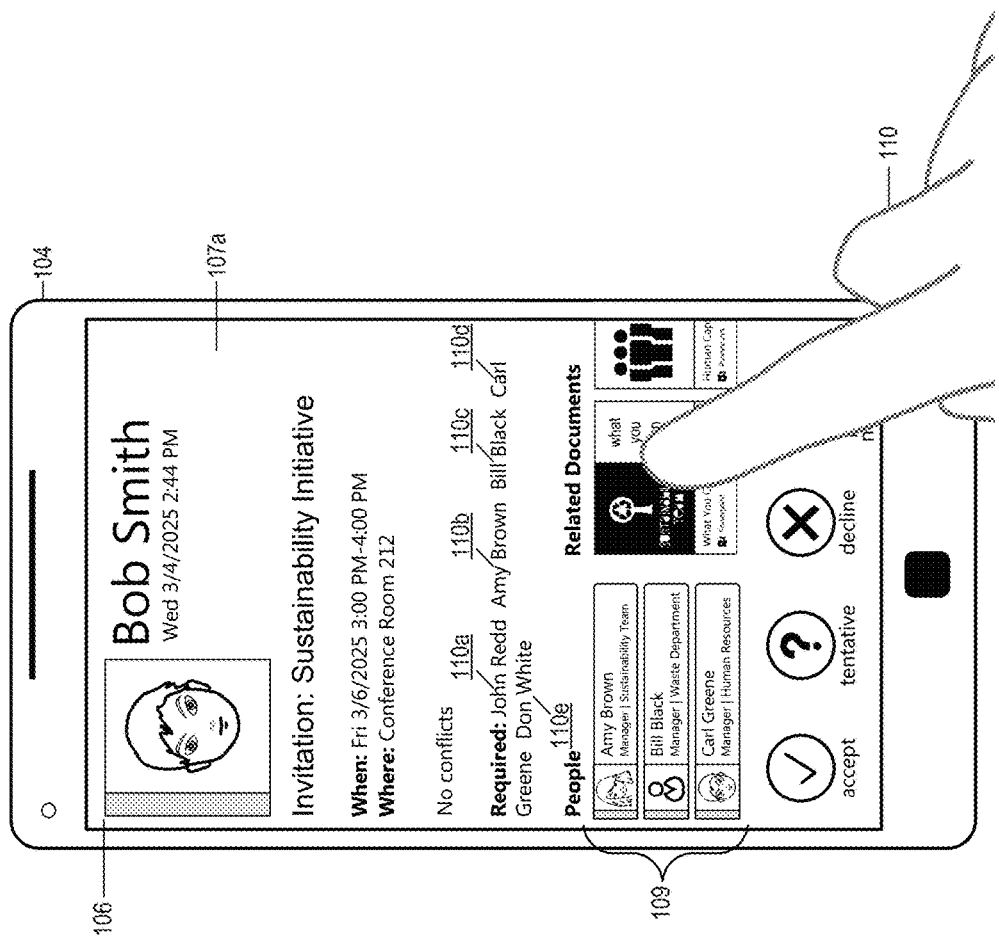
FIG. 4C is an example illustration of a personalized electronic message embodied as a meeting request displayed on a smartphone.
Figure 5:
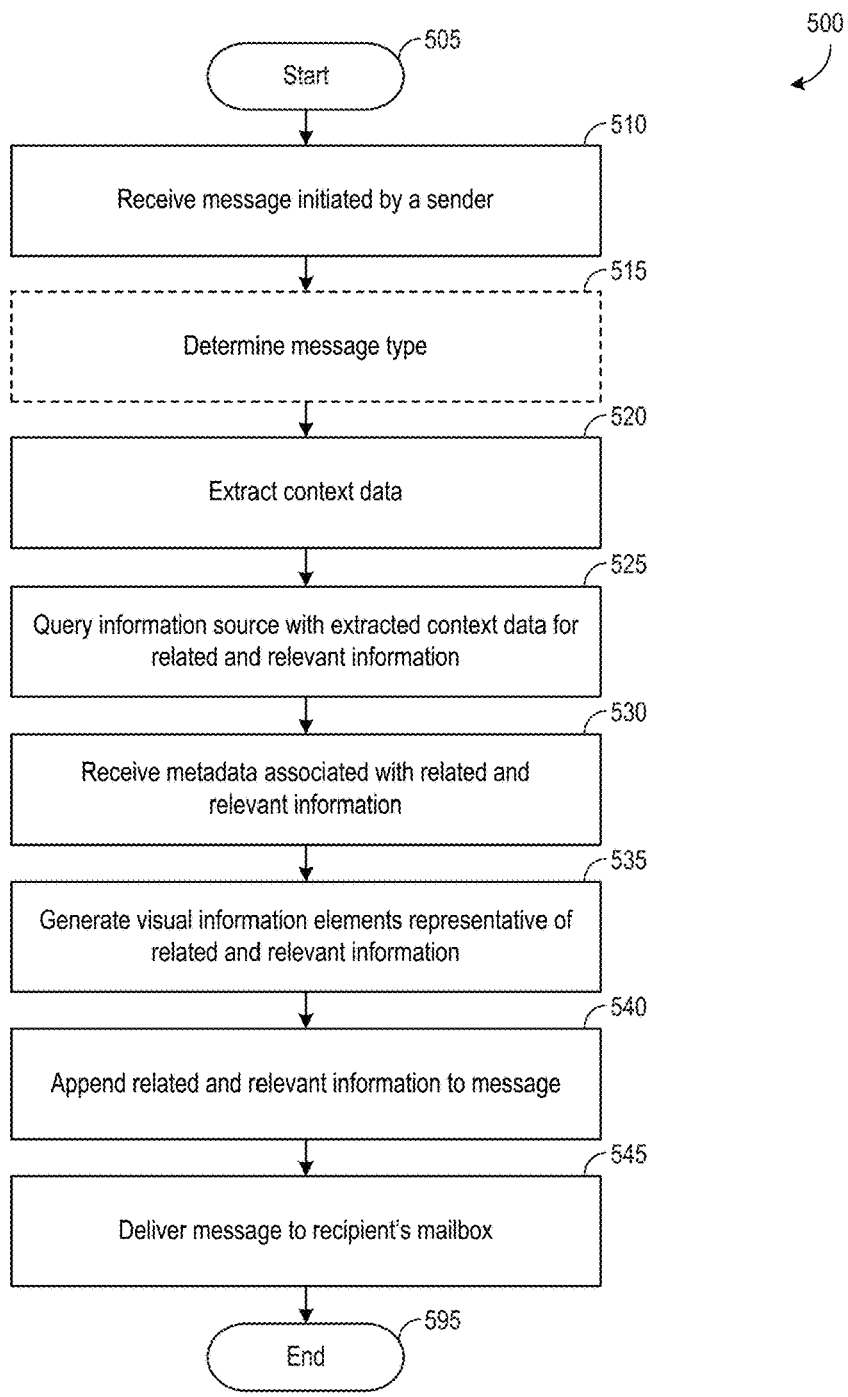
FIG. 5 is a flow chart showing general stages involved in an example method for personalizing an electronic message.

FIG. 4C shows the example personalized electronic message 107a embodied as a meeting request message from FIG. 4B displayed on a mobile computing device 104. For example, recipient user A 110a "John Redd" receives the personalized electronic message 107a (i.e., personalized meeting request), and the personalized electronic message 107a is displayed on a display screen associated with the mobile computing device 104 via a client mail user agent 106 executing on the mobile computing device 104.

Having described an operating environment and various aspects with respect to FIGS. 1-4, FIG. 5 illustrates a flow chart showing general stages involved in an example method for personalizing an electronic message 105. The method 500 begins at start OPERATION 505 and proceeds to OPERATION 510, where the message receiving engine 208 receives an electronic message 105 initiated by a sender user 102 and addressed to one or more recipient users 110. According to examples, the electronic message 105 is an email, a meeting request, or other type of electronic message created via a client mail user agent 106 and communicated to one or more mailbox delivery agents 112, wherein each delivery agent 112 is associated with a recipient 110 of the electronic message 105.

The method 500 continues to optional OPERATION 515, where the message receiving engine 208 determines a type of electronic message 105 that is received. For example, if the electronic message 105 is a meeting request, the message includes a descriptor class type that identifies the electronic message 105 as a meeting request or calendar item, which the message receiving engine 208 is operable to identify. In some examples, the mailbox delivery agent 112 personalizes only electronic messages 105 that are meeting requests.

After optionally identifying a received electronic message 105 as a meeting request (optional OPERATION 515) or after OPERATION 510, the method 500 continues to OPERATION 520, where the parser 210 parses the electronic message 105, and identifies and extracts context data from the electronic message 105. For example, the parser 210 identifies and extracts a subject of the electronic message 105 and other recipients of the electronic message 105.

The method 500 continues to OPERATION 525, where the query engine 212 runs a query against an information source 116 for information related to the context data extracted by the parser 210 and related to the recipient user 110 of the electronic message 105. According to an example, the information source 116 is a graph server, such as the example graph server 306 illustrated in FIG. 3. For example, the query engine 212 makes a call to the graph index 312 via the search API 320 for information items 304 related to the subject or recipients 110 of the electronic message 105 on which the recipient user 110 has not acted (e.g., information items 304 that are not connected to the recipient user 110 in the graph index 312 via an edge 316, nodes 314 of information items 304 that do not include the recipient 110 in the properties, etc.). As another example, the query engine 212 makes a call to the graph index 312 via the search API 320 for information related to recipients of the electronic message 105 who the recipient user 110 does not share a close social relationship (e.g., with whom the recipient 110 does not regularly communicate, attend the same meetings, work together, interact, or share an organizational relationship (e.g., colleague, peer, manages, directs, etc.)).

The method 500 continues to OPERATION 530, where the query component 212 receives a query response from the information source 116 (e.g., the graph server 306). According to examples, the query engine 212 receives a response comprising metadata associated with information items 304 and information identified as related to the electronic message 105 and relevant to the recipient user 110. For example, the metadata may comprise such information as titles, descriptions, summaries, images, URLs, activity information (e.g., who authored, modified, viewed, commented on, shared an information item 304 and when), and profile information associated with one or more of the other recipients of the electronic message 105, such as the recipient's name, image, department, title, colleagues, managers, directs, an organizational chart, a URL, etc.

The method 500 continues to OPERATION 535, where the personalized message generator 214 generates one or more visual information elements 109 representing the relevant information items 304 related to the electronic message 105 and relevant information related to the other recipients 110. In some examples, the one or more visual information elements 109 are content cards that include one or more pieces of metadata associated with information items 304 and information identified as related to the electronic message 105 and relevant to the recipient user 110.

For example, a content card may include a title, summary, description, preview image, tags, information associated with who authored, shared, modified, or liked the information item 304, a link to access the information item 105, etc. As another example, a content card may be representative of another recipient of the electronic message 105 whom the recipient user 110 does not share a close social relationship, and may include an image of the person, the person's name, department, title, colleagues, managers, and directs, an organizational chart, a URL to access a profile page of the person and information items 304 authored by, modified by, shared by, or trending around the person, etc.

The method 500 continues to OPERATION 540, where the personalized message generator 214 appends the one or more visual information elements 109 to the electronic message 105, and thus transforms the electronic message 105 into a personalized electronic message 107.

The method 500 continues to OPERATION 545, where the message delivery engine 216 delivers the personalized electronic message 107 to the recipient user's mailbox database 114 such that the recipient user 110 can access and retrieve the personalized electronic message 107 via a client mail user agent 106 executing on a computing device 104. Accordingly, the recipient user 110 is enabled to interact with the personalized electronic message 107, for example, the recipient user 110 may select a visual information element 109 included in the personalized electronic message 107, and view the information item 304 or profile information represented by the visual information element 109.

The method 500 ends at OPERATION 595.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
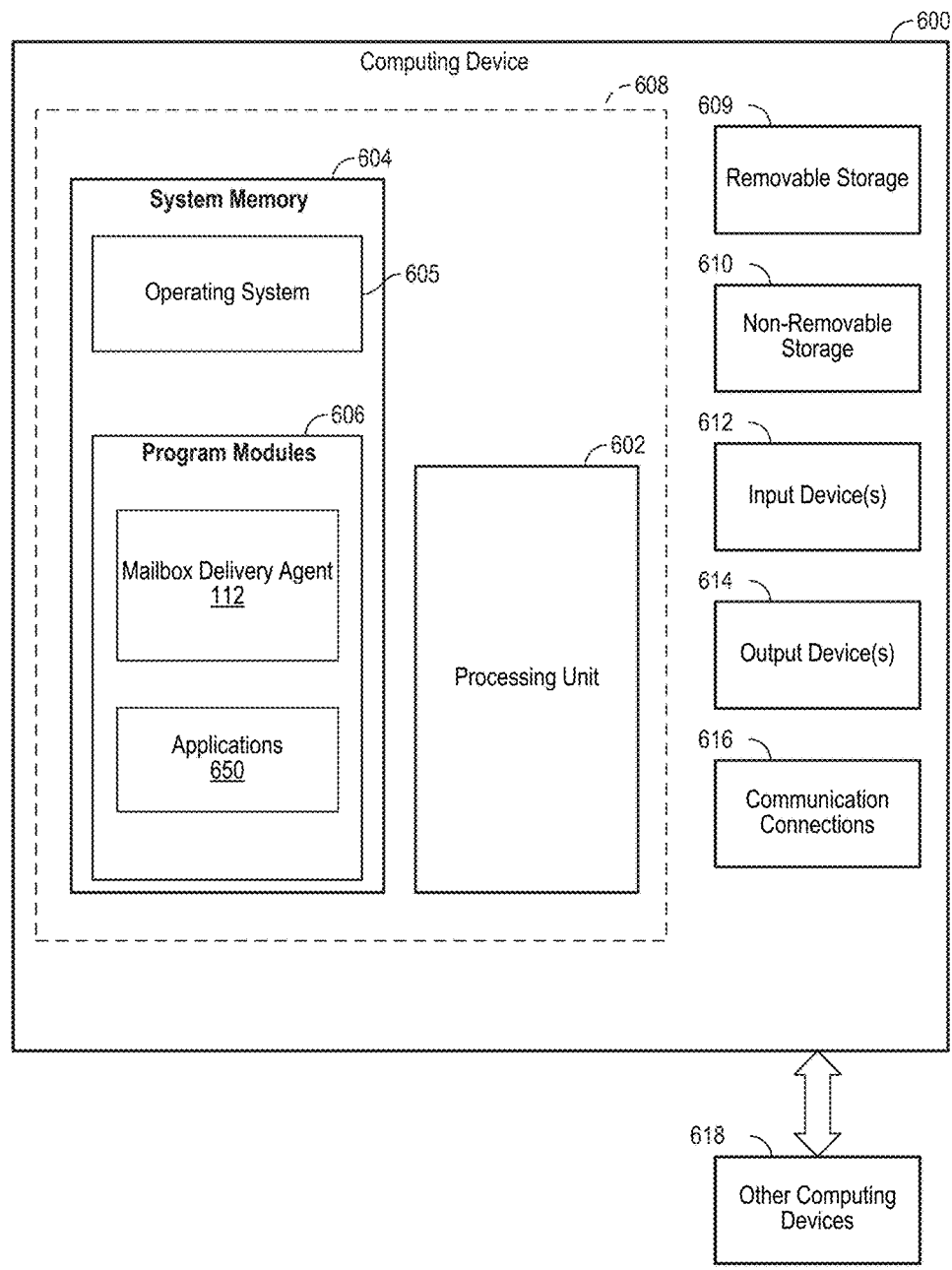
FIG. 6 is a block diagram illustrating example physical components of a computing device.
Figure 7A:
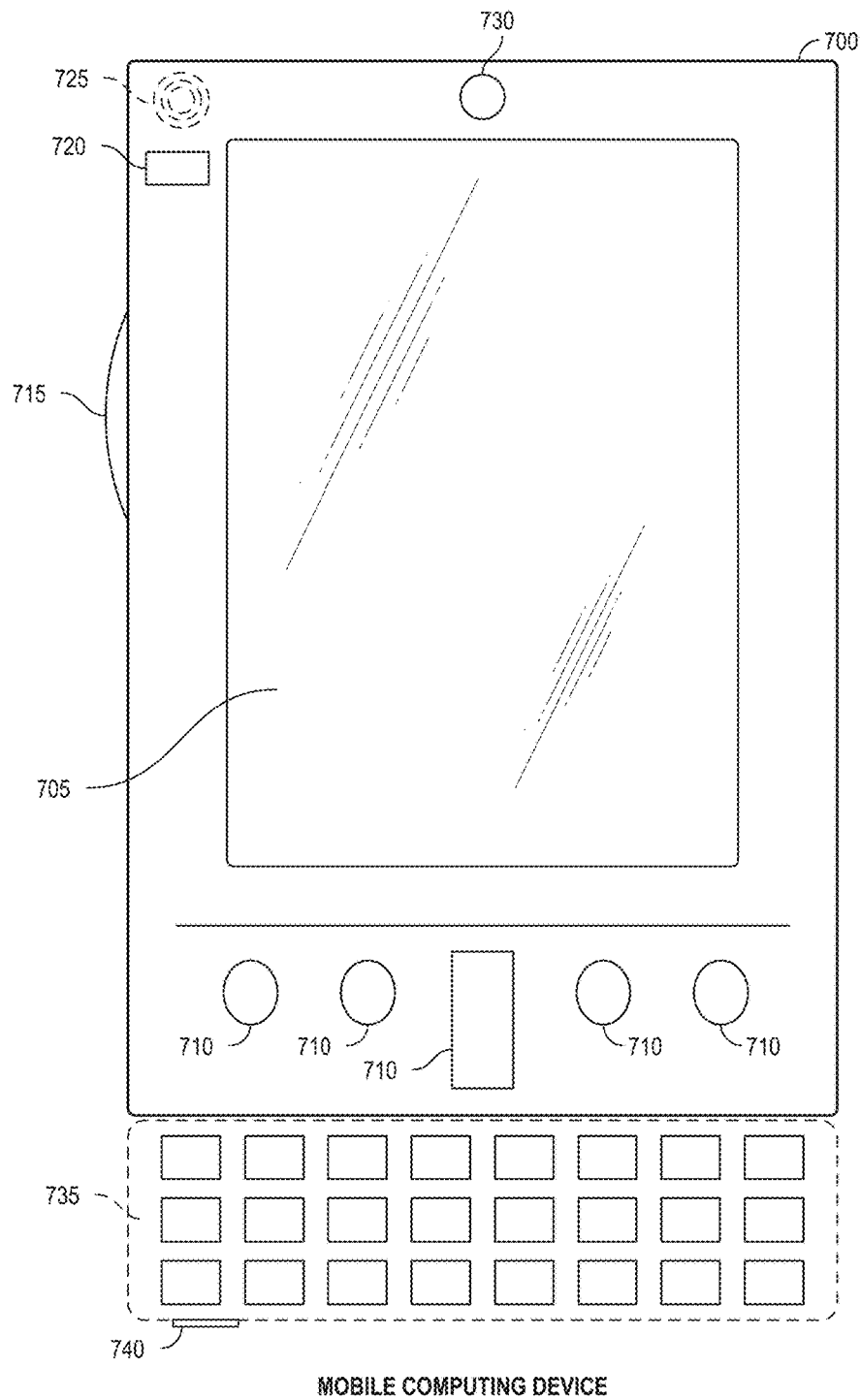
FIGS. 7A and 7B are simplified block diagrams of a mobile computing device.
Figure 7B:
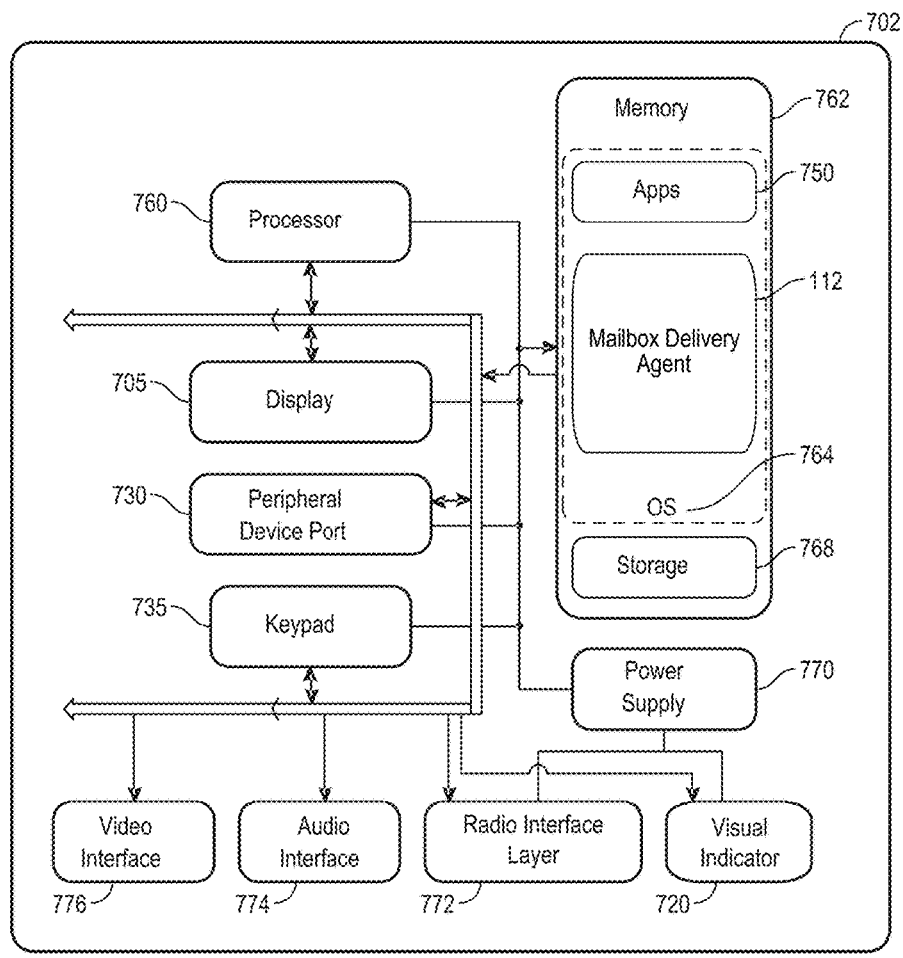
Figure 8:
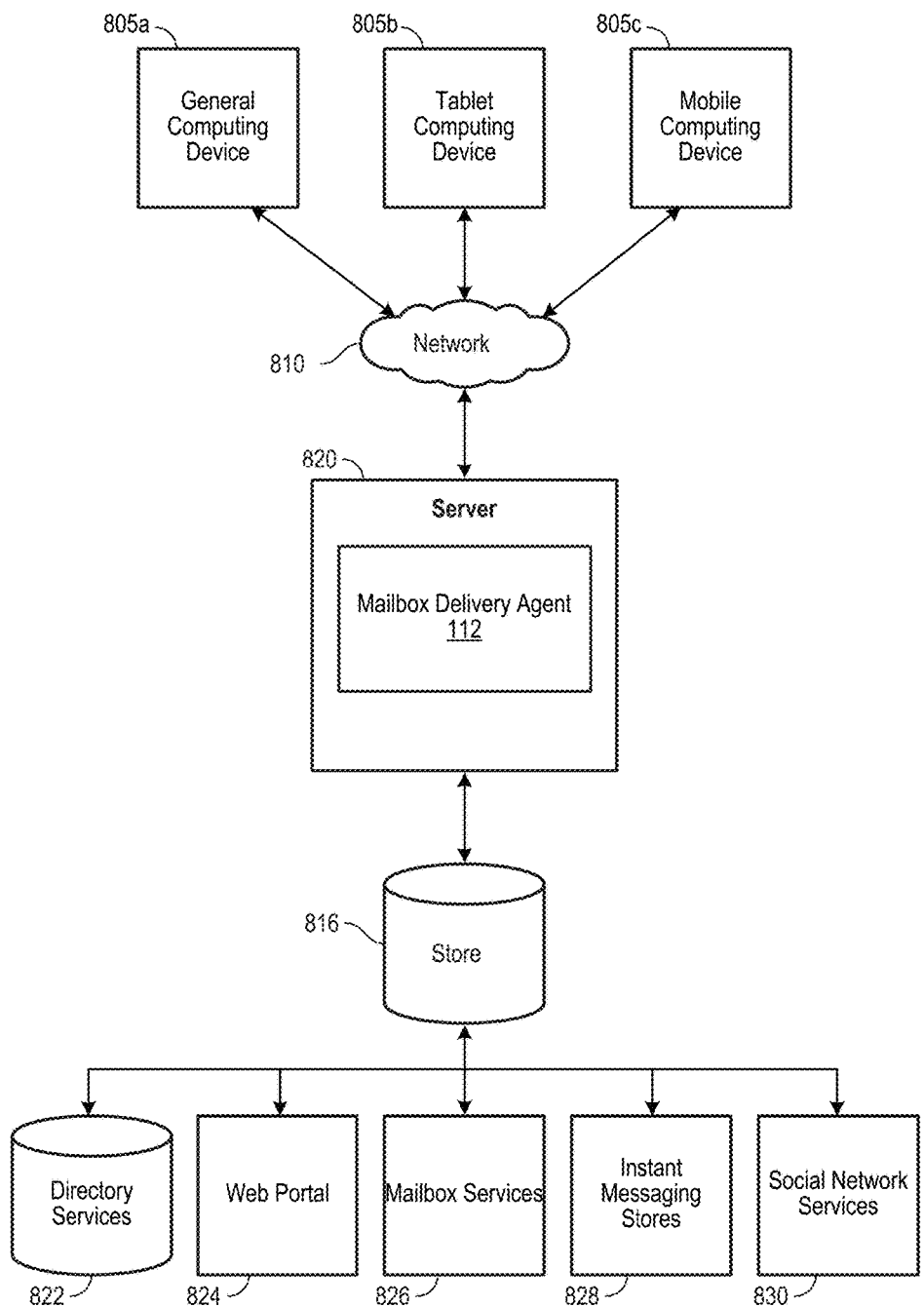
FIG. 8 is a simplified block diagram of a distributed computing system.

FIG. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure are practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the mailbox delivery agent 112. The operating system 605, for example, is suitable for controlling the operation of the computing device 600. Furthermore, aspects are practiced in conjunction with a graphics library, other operating systems, or any other application program, and is not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., mailbox delivery agent 112) perform processes including, but not limited to, one or more of the stages of the method 500 illustrated in FIG. 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the mailbox delivery agent 112 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for personalizing an electronic message 105 as described above. Content developed, interacted with, or edited in association with the mailbox delivery agent 112 is enabled to be stored in different communication channels or other storage types. For example, various documents may be stored using a directory service 822, a web portal 824, a mailbox service 826, an instant messaging store 828, or a social networking site 830. The mailbox delivery agent 112 is operable to use any of these types of systems or the like for personalizing an electronic message 105, as described herein. According to an aspect, a server 820 provides the mailbox delivery agent 112 to clients 805a,b,c. As one example, the server 820 is a web server providing the mailbox delivery agent 112 over the web. The graph server 306 provides the mailbox delivery agent 112 over the web to clients 805 through a network 810. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for personalizing an electronic message, comprising:
    receiving an electronic message intended for a recipient user at a mailbox delivery agent associated with the recipient user;
    identifying and extracting, by the mailbox delivery agent, context data from the electronic message including identities of a set of other recipients of the electronic message beside the recipient user;
    querying, by the mailbox delivery agent, an information source for information related to the context data;
    receiving, at the mailbox delivery agent, from the information source, a query response comprising information related to the context data, wherein the query response identifies information related to a subset of recipients, from the set of other recipients, with whom the recipient user does not share a close social relationship;
    appending, by the mailbox delivery agent, one or more visual information elements representing the information related to the context data to the electronic message, the one or more visual information elements comprising selectable content cards including:
    profiles associated with the subset of recipients with whom the recipient user does not share a close social relationship, wherein selection of a profile provides access via a link to a network store for displaying profile information regarding another recipient with whom the recipient user does not share a close social relationship, and documents related to a subject of the electronic message, wherein selection of a document provides access via a link to a network store for viewing the document; and
    delivering, by the mailbox delivery agent, the electronic message comprising the appended information to a mailbox database of the recipient user, wherein the appended information is being provided within the electronic message to improve an electronic application to automatically provide personalized and related information to the recipient of the electronic message.

2. The method of claim 1, wherein identifying and extracting context data from the electronic message further comprises identifying and extracting a subject of the electronic message.

3. The method of claim 2, wherein querying the information source for information related to the context data comprises querying a graph index for information related to the context data.

4. The method of claim 3, wherein querying the graph index for information related to the context data further comprises querying the graph index for information relevant to the recipient user.

5. The method of claim 4, wherein querying the graph index for information related to the context data and relevant to the recipient user comprises querying the graph index for information items related to the subject of the electronic message that the recipient user has not acted on previously.

6. The method of claim 4, wherein querying the graph index for information related to the context data and relevant to the recipient user comprises querying the graph index for information related to the subset of recipients of the electronic message with whom the recipient user does not share a close social relationship.

7. The method of claim 6, wherein:
    receiving the electronic message intended for a recipient user comprises receiving a meeting request intended for a meeting invitee;
    querying the graph index for information items related to the subject of the electronic message that the recipient user has not acted on previously comprises querying the graph index for information items related to the subject of a meeting; and
    querying the graph index for information related to the subset of recipients of the electronic message who the recipient user does not share a close social relationship comprises querying the graph index for one or more other meeting invitees.

8. The method of claim 7, wherein prior to identifying and extracting context data from the electronic message, determining that the electronic message is a meeting request.

9. The method of claim 1, wherein receiving a query response comprising information related to the context data comprises receiving metadata associated with the information related to the context data.

10. The method of claim 9, wherein receiving metadata associated with the information related to the context data comprises receiving at least one of:
   titles of information items;
   descriptions of information items;
   summaries of information items;
   images of information items;
   uniform resource locators (URLs) of information items;
   activity information of information items;
   profile information of recipients;
   images of recipients;
   URLs of recipients profile pages; and
   organizational charts of recipients.

11. The method of claim 9, wherein appending the information related to the context data to the electronic message comprises:
   generating one or more visual information elements representing the information related to the context data; and
   appending the one or more visual information elements to the electronic message.

12. A system for personalizing an electronic message, comprising:
   one or more processors for executing programmed instructions;
   memory, coupled to the one or more processors, for storing program instruction steps for execution by the computer processor; and
   a mailbox delivery agent comprising:
   a message receiving engine operable to receive an electronic message intended for a recipient user;
   a parser operable to identify and extract context data from the electronic message, the context data including identifies of a set of other recipients for whom the electronic message is intended in addition to the recipient user;
   a query engine operable to:
      query an information source for information related to the context data and relevant to the recipient user for a subset of recipients from the set of other recipients with whom the recipient user does not share a close social relationship; and
      receive a query response comprising information related to the context data and relevant to the recipient user;
   a personalized message generator operable to:
   generate one or more visual information elements representing the information related to the context data and relevant to the recipient user; and
   append the one or more visual information elements to the electronic message, the one or more visual information elements comprising selectable content cards including:
   profiles associated with the subset of recipients with whom the recipient user does not share a close social relationship, wherein selection of a profile provides access via a link to a network store for displaying profile information regarding another recipient with whom the recipient user does not share a close social relationship, and documents related to a subject of the electronic message, wherein selection of a document provides access via a link to a network store for viewing the document; and
   a message delivery engine operable to transmit the electronic message comprising the one or more appended visual information elements to a mailbox database of the recipient user, wherein the one or more visual information elements are being provided within the electronic message to improve an electronic application to automatically provide personalized and related information to the recipient of the electronic message.

13. The system of claim 12, wherein in identifying and extracting the context data from the electronic message, the parser is further operable to identify and extract a subject of the electronic message.

14. The system of claim 13, wherein in querying the information source for information related to the context data and relevant to the recipient user, the query engine is operable to query a graph index for information related to the context data and relevant to the recipient user.

15. The system of claim 14, wherein in querying the graph index for information related to the context data and relevant to the recipient user, the query engine is operable to query the graph index for:
   information items related to the subject of the electronic message that the recipient user has not acted on previously; and
   information related to the other recipients of the electronic message to determine whether each of the other recipients shares the close social relationship with the recipient user based on at least one of:
   regular communications with the recipient user;
   attendance at meetings with the recipient user; and
   sharing an organization relationship with the recipient user.

16. The system of claim 15, wherein:
   the electronic message is a meeting request intended for a meeting invitee; and
   the query engine is operable to:
      query the graph index for information items related to the subject of a meeting that the recipient user has not acted on previously; and
      query the graph index for one or more meeting invitees with whom the recipient user does not share a close social relationship.

17. The system of claim 12, wherein in receiving a query response comprising information related to the context data and relevant to the recipient user, the query engine is operable to receive metadata associated with the information related to the context data and relevant to the recipient user, the metadata including at least one of:
   titles of information items;
   descriptions of information items;
   summaries of information items;
   images of information items;
   uniform resource locators (URLs) of information items;
   activity information of information items;
   profile information of recipients;
   images of recipients;
   URLs of recipients profile pages; and
   organizational charts of recipients.

18. One or more computer storage media storing computer-usable instructions that, when used by one or more computing devices, cause the one or more computing devices to perform a method for personalizing an electronic meeting invitation, the method comprising:
   receiving an electronic meeting invitation intended for a recipient user at a mailbox delivery agent associated with the recipient user;
   identifying and extracting, by the mailbox delivery agent, context data from the electronic meeting invitation, the context data including a subject of the meeting invitation and identities of a set of meeting invitees who are intended recipients of the electronic meeting invitation in addition to the recipient user;

querying, by the mailbox delivery agent, an information source for information related to the context data and relevant to the recipient user, wherein the information related to the context data and relevant to the recipient user identifies information related to a subset of the set of meeting invitees with whom the recipient user does not share a close social relationship;

receiving, at the mailbox delivery agent from the information source, a query response comprising information related to the context data and relevant to the recipient user, wherein the query response identifies information related to the subset of meeting invitees with whom the recipient user does not share a close social relationship;

generating, at the mailbox delivery agent, one or more visual information elements representing the information related to the context data and relevant to the recipient user;

appending, by the mailbox delivery agent, the one or more visual information elements to the electronic meeting invitation, representing the information related to the context data to the electronic message, the one or more visual information elements comprising selectable content cards including:

profiles associated with the subset of meeting invitees with whom the recipient user does not share a close social relationship, wherein selection of a profile provides access via a link to a network store for displaying profile information regarding another recipient with whom the recipient user does not share a close social relationship, and documents related to a subject of the electronic message, wherein selection of a document provides access via a link to a network store for viewing the document; and delivering, by the mailbox delivery agent, the electronic meeting invitation comprising the one or more appended visual information elements to a mailbox database of the recipient user, wherein the one or more visual information elements are being provided within the electronic message to improve an electronic application to automatically provide personalized and related information to the recipient of the electronic message.

19. The one or more computer storage media of claim 18, wherein querying the information source for information related to the context data and relevant to the recipient user comprises querying a graph index for:

information items related to the subject of the electronic meeting invitation that the recipient user has not acted on previously; and information related to one or more meeting invitees who the recipient user does not share a close social relationship.

20. The one or more computer storage media of claim 18, wherein generating one or more visual information elements representing the information related to the context data and relevant to the recipient user comprises generating one or more visual information elements including one or more pieces of metadata associated with the information related to the context data and relevant to the recipient user, the one or more pieces of metadata including at least one of:

titles of information items;
descriptions of information items;
summaries of information items;
images of information items;
uniform resource locators (URLs) of information items;
activity information of information items;
profile information of recipients;
images of recipients;
URLs of recipients profile pages; and
organizational charts of recipients.

\* \* \* \* \*